United States Patent
Aoki et al.

(10) Patent No.: US 10,396,641 B2
(45) Date of Patent: Aug. 27, 2019

(54) RESIN INJECTION METHOD INTO LAMINATED CORE, AND ROTATING ELECTRIC MACHINE USING THE RESIN INJECTION METHOD

(71) Applicant: Mitsubishi Electric Corporation, Chiyoda-ku, Tokyo (JP)

(72) Inventors: Minoru Aoki, Tokyo (JP); Yoshihide Kikuichi, Tokyo (JP); Tetsuro Yanagi, Tokyo (JP); Yuichiro Sasaki, Tokyo (JP); Koji Mio, Osaka (JP); Hideaki Shigekiyo, Kobe (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1027 days.

(21) Appl. No.: 14/439,282

(22) PCT Filed: Jan. 14, 2014

(86) PCT No.: PCT/JP2014/050424
§ 371 (c)(1),
(2) Date: Apr. 29, 2015

(87) PCT Pub. No.: WO2014/132682
PCT Pub. Date: Sep. 4, 2014

(65) Prior Publication Data
US 2015/0288263 A1    Oct. 8, 2015

(30) Foreign Application Priority Data
Feb. 28, 2013   (JP) .................................. 2013-038254

(51) Int. Cl.
*B29C 45/14*        (2006.01)
*H02K 15/12*        (2006.01)
(Continued)

(52) U.S. Cl.
CPC .......... *H02K 15/12* (2013.01); *B29C 31/041* (2013.01); *B29C 45/14508* (2013.01);
(Continued)

(58) Field of Classification Search
None
See application file for complete search history.

(56) References Cited

U.S. PATENT DOCUMENTS 2,990,441 A * 6/1961 Marsal .................... H01M 6/48
                                                   178/69 R
3,223,056 A * 12/1965 Wilburn ................. A47B 13/08
                                                   108/150
(Continued)

FOREIGN PATENT DOCUMENTS

JP          3-112344 A       5/1991
JP          8-35224 A        2/1996
(Continued)

OTHER PUBLICATIONS

International Search Report (PCT/ISA/210) dated Apr. 28, 2014, by the Japanese Patent Office as the International Searching Authority for International Application No. PCT/JP2014/050424.

*Primary Examiner* — Edmund H Lee
(74) *Attorney, Agent, or Firm* — Buchanan Ingersoll & Rooney PC (57) ABSTRACT

An object is to easily inject resin into a gap of a laminated core which constitutes a rotating electric machine. Included are: a resin supplying unit which feeds the resin; and a resin injection unit which injects the resin into an axial hole of the laminated core. The resin injection unit has an injection pipe and an elastic ring attached to the injection pipe. This elastic ring is made to firmly attach to the inner periphery of the axial hole; the resin is supplied from the resin supplying
(Continued)

unit; and the resin is injected into the gap of the laminated core through the axial hole of the laminated core.

3 Claims, 8 Drawing Sheets

(51) Int. Cl.
    *H02K 1/00*     (2006.01)
    *H02K 15/10*     (2006.01)
    *B29C 31/04*     (2006.01)
    *B29L 31/34*     (2006.01)

(52) U.S. Cl.
    CPC ............... *H02K 1/00* (2013.01); *H02K 15/10* (2013.01); *B29C 2045/1454* (2013.01); *B29L 2031/34* (2013.01); *H02K 2201/09* (2013.01)

(56) References Cited

U.S. PATENT DOCUMENTS

| | | | | |
|---|---|---|---|---|
| 3,304,358 | A * | 2/1967 | Lacy | H02K 1/146 264/159 |
| 5,075,585 | A | 12/1991 | Teruyama et al. | |
| 5,806,169 | A * | 9/1998 | Trago | H02K 5/08 264/272.2 |
| 6,121,709 | A * | 9/2000 | Fathimulla | H02K 1/04 310/216.004 |
| 7,854,056 | B2 * | 12/2010 | Watanabe | H02K 15/03 29/596 |
| 8,578,592 | B2 * | 11/2013 | Nagai | H02K 1/276 29/598 |
| 9,373,991 | B2 * | 6/2016 | Mabu | H02K 15/03 |
| 9,819,251 | B2 * | 11/2017 | Mabu | H02K 15/12 |
| 9,979,264 | B2 * | 5/2018 | Ishimatsu | B29C 45/14467 |
| 2012/0227249 | A1 | 9/2012 | Mabu et al. | |
| 2014/0131919 | A1 * | 5/2014 | Mabu | H02K 15/03 264/263 |
| 2014/0196276 | A1 * | 7/2014 | Nagai | H02K 15/03 29/598 |
| 2015/0054196 | A1 * | 2/2015 | Ishimatsu | B29C 45/14467 264/263 |

FOREIGN PATENT DOCUMENTS

JP             8-7798 Y2     3/1996
JP          2011-125116 A     6/2011

* cited by examiner

RESIN INJECTION METHOD INTO LAMINATED CORE, AND ROTATING ELECTRIC MACHINE USING THE RESIN INJECTION METHOD

TECHNICAL FIELD

The present invention relates to a resin injection apparatus into a laminated core for use in a rotating electric machine, a resin injection method into a laminated core, and a rotating electric machine to be manufactured by using the resin injection method.

BACKGROUND ART

A stator and a rotor of a rotating electric machine generally uses a laminated core; and this laminated core is configured by laminating a thin silicon steel sheet coated with insulation varnish on the surface thereof in order to reduce eddy-current loss during operation of the rotating electric machine. This laminated core sheet is fastened and fixed by a bolt or the like; however, a slight gap is likely to be occurred between the laminated core sheets as the rotating electric machine is increased in size and the laminated core becomes larger. If such a slight gap exists, there is a possibility to generate a harmful effect in which rigidity of the laminated core is deteriorated and vibration of the rotating electric machine is increased during operation.

Therefore, as means of filling the gap between the laminated core sheets, there is known a method in which the laminated core itself is dipped in a tank filled with resin to impregnate the resin into the gap, and there is disclosed a technique in which resin is injected into a space formed by a stator core and a bracket to enhance rigidity (For example, refer to Patent Document 1).

RELATED ART DOCUMENT

Patent Document

Patent Document 1: JP-A-H3 (1991)-112344 (Page 3, FIG. 3)

SUMMARY OF THE INVENTION

Problems to be Solved by the Invention

However, the method of soaking the laminated core sheet itself in the tank filled with resin in order to fill the gap between the laminated core sheets and the method of covering the whole stator core portion with resin by injecting the resin in the bracket like Patent Document 1 are effective for the case where the rotating electric machine is small; but, when the rotating electric machine itself is increased in size like a large capacity generator, a manufacturing apparatus becomes larger in size and large-scale work is needed; and accordingly, a problem exists in that it is difficult to directly apply the aforementioned methods.

The present invention has been made to solve the above described problem, and an object of the present invention is to provide a resin injection apparatus into a laminated core, a resin injection method into a laminated core, and a rotating electric machine using the resin injection method, those of which can easily inject resin into the laminated core of the rotating electric machine and are capable of enhancing rigidity of the laminated core.

Means for Solving the Problems

According to the present invention, there is provided a resin injection apparatus into a laminated core, which uses an axial hole provided in a laminated core of a rotating electric machine and injects resin into a gap of the laminated core, the resin injection apparatus into the laminated core including: a resin supplying unit which has a resin container that accumulates the resin and a pump; and a resin injection unit which injects the resin supplied from the resin supplying unit into the axial hole of the laminated core. The resin injection unit has: an injection pipe which has an outer diameter capable of inserting into the axial hole and a center hole serving as a resin path; and an elastic ring attached to the outer periphery of the injection pipe. The resin is supplied from the resin supplying unit to the injection pipe and the resin is injected into the gap of the laminated core through the inside of the axial hole in a state where the injection pipe is inserted into the axial hole and the outer periphery of the elastic ring is firmly attached to the inner periphery of the axial hole.

Furthermore, according to the present invention, there is provided a resin injection method into a laminated core, which uses an axial hole provided in a laminated core of a rotating electric machine and injects resin into a gap of the laminated core, the resin injection method into the laminated core including: a resin supplying unit which has a resin container that accumulates the resin and a pump; and a resin injection unit which injects the resin supplied from the resin supplying unit into the axial hole of the laminated core. The resin injection method into the laminated core includes the steps of: inserting an injection pipe of the resin injection unit from one end of the axial hole; injecting the resin into the injection pipe by putting pressure from the resin supplying unit in a state where the gap between the outer peripheral side of the injection pipe and the inner peripheral side of the axial hole is blocked by an elastic ring provided on the outer periphery of the injection pipe; and discharging the resin remained in the axial hole by supplying air into the injection pipe after resin injection.

Moreover, according to the present invention, there is provided a rotating electric machine including: a stator having a stator core in which a stator winding is wound; a frame surrounding the stator core; and a rotor having a rotor core which faces the inside of the stator core via an air gap, the stator core and the rotor core being made of a laminated core laminated with thin sheets. The stator core or the rotor core is manufactured by the above-mentioned resin injection method into the laminated core.

Advantageous Effect of the Invention

According to the resin injection apparatus into the laminated core of the present invention, the resin injection unit has: the injection pipe which has the center hole serving as the resin path and the outer diameter capable of inserting into the axial hole and is connected to the resin supplying unit; and the elastic ring attached to the outer periphery of the injection pipe. The resin is supplied from the resin supplying unit to the injection pipe and the resin is injected into the gap of the laminated core through the inside of the axial hole in the state where the injection pipe is inserted into the axial hole and the outer periphery of the elastic ring is firmly attached to the inner periphery of the axial hole. Therefore, the resin can be easily injected to the gap of the laminated core even in the case of the laminated core of the large-size rotating electric machine and rigidity of the laminated core can be enhanced.

Furthermore, according to the resin injection method into the laminated core of the present invention, the resin injection method into the laminated core includes: the resin supplying unit which has the resin container that accumulates the resin and the pump; and the resin injection unit which injects the resin supplied from the resin supplying unit into the axial hole of the laminated core. The resin injection method into the laminated core includes the steps of: inserting the injection pipe of the resin injection unit from one end of the axial hole; injecting the resin into the injection pipe by putting pressure from the resin supplying unit in the state where the gap between the outer peripheral side of the injection pipe and the inner peripheral side of the axial hole is blocked by the elastic ring provided on the outer periphery of the injection pipe; and discharging the resin remained in the axial hole by supplying air into the injection pipe after resin injection. Therefore, the laminated core having high rigidity can be effectively manufactured.

Moreover, according to the rotating electric machine of the present invention, at least one of the stator core and the rotor core, which are made of the laminated core, is manufactured by the above-mentioned resin injection method. Therefore, rigidity of the laminated core can be enhanced and there can be obtained the rotating electric machine in which vibration during operation is reduced.

MODE FOR CARRYING OUT THE INVENTION

Embodiment 1

Hereinafter, the present invention will be described with reference to drawings.

First, the schematic configuration of a rotating electric machine to which a resin injection apparatus according to the present invention is applied will be described by using FIG. 1.

Figure 1:
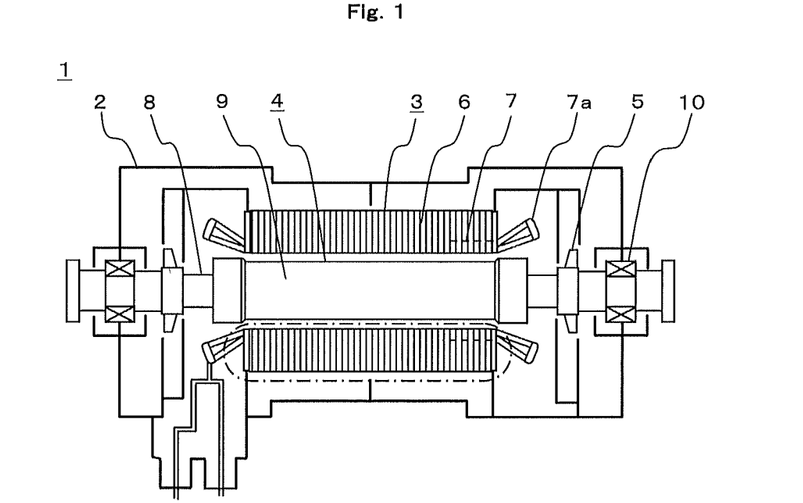
FIG. 1 is a sectional view showing the schematic configuration of a rotating electric machine to which the present invention is applied.

FIG. 1 shows a large-size generator as an example of a general rotating electric machine and is a sectional view seen from a direction orthogonal to an axis line of a rotating shaft. A rotating electric machine 1 includes: a casing 2 filled with cooling gas; a stator 3 disposed in a casing 2; a rotor 4 arranged on the inner peripheral side of the stator 3 via a predetermined clearance; and a fan 5 which circulates cooling gas in the casing 2. Furthermore, although not shown in the drawing, a heat exchanger is arranged in a path of the cooling gas in some cases.

The stator 3 has a stator core 6 made of a laminated core in which a magnetic steel sheet is laminated in an axial direction; and a stator coil 7 inserted in a slot formed in an inner peripheral portion of the stator core 6. Furthermore, a main lead 7b is connected on the lower side of one (the left in the drawing) of coil ends 7a on both end sides of the stator coil 7 and is led out to the outside of the casing 2.

On the other hand, the rotor 4 is composed of a rotating shaft 8, a rotor core 9 attached to the rotating shaft 8, and a rotor coil (not shown in the drawing) inserted in a slot formed in the axial direction of the rotor core 9; and both end portions of the rotating shaft 8 are rotatably supported by bearings 10 mounted to the casing 2.

Figure 2A:
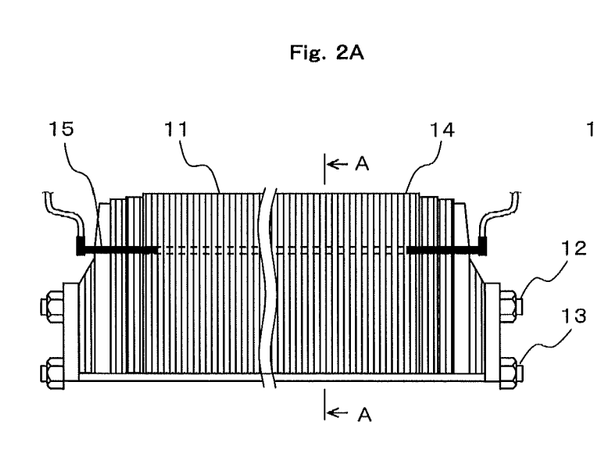
FIG. 2A is a general outline view showing a state where a resin injection apparatus into a laminated core of Embodiment 1 of the present invention is applied and FIG. 2B is a partial general outline view taken along a B-B line.
Figure 2B:
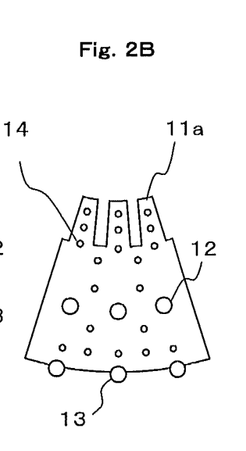

FIGS. 2A and 2B show that a portion A surrounded by a dashed-dotted line in FIG. 1 is enlarged; FIG. 2A is a general outline view showing a state where the resin injection apparatus into the laminated core of Embodiment 1 of the present invention is combined; and FIG. 2B is a relevant part general outline view seen along a B-B line in FIG. 2A.

In the drawings, the stator core 6 is made of a laminated core 11 in which a large number of magnetic steel sheets are laminated in the axial direction and, hereinafter, description will be made by assigning reference numerals as follows: a laminated core 11 when referring to a laminated core; and a laminated core sheet 11a when referring to an individual laminated core sheet. In this case, the laminated core sheet 11a can be formed in a disk shape by punching a plate-like magnetic steel sheet at one time if in the case of a small-size rotating electric machine; however, in the case of a large-size, the laminated core sheet 11a cannot be formed by punching at one time. Thus, as shown in FIG. 2B, the plate-like magnetic steel sheet is punched in a fan-like fashion and is formed by combining in a circle while lapping the punched magnetic steel sheets in a circumferential direction.

Such laminated core sheets 11a are laminated in plural sheets and are fastened in a lamination direction to form the integrated laminated core 11 by inserting a bolt such as a through bolt 12 or a core bolt 13 into a through hole that passes through these laminated core sheets. At this time, it is unavoidable that the larger the laminated core 11 becomes, the more a slight gap occurs between the respective laminated core sheets 11a. Furthermore, the gap is also enlarged as results from long-term use in some cases.

Further, if the laminated core 11 is a particularly large-size, an axial hole 14 is often formed in some cases in order to pass cooling gas through the laminated core 11. The present invention basically uses the axial hole 14 and resin is injected into the slight gap between the laminated core sheets 11a by using the resin injection apparatus, so that rigidity of the laminated core 11 of the rotating electric machine 1 is enhanced.

Incidentally, there is a case where the axial hole 14 is provided for other applications other than passing the cooling gas; however, the present invention can be applied to even such a case. Furthermore, FIG. 2A shows a state where a resin injection unit 15 of the resin injection apparatus (to be described next) is attached at one place of the axial hole 14.

Figure 3A:
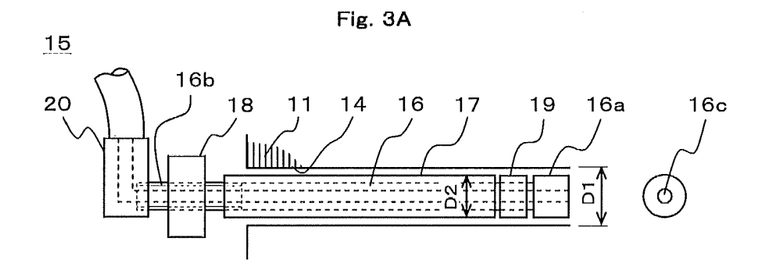
FIGS. 3A and 3B are general outline views each showing an operation process of the resin injection apparatus into the laminated core in FIGS. 2A and 2B.
Figure 3B:
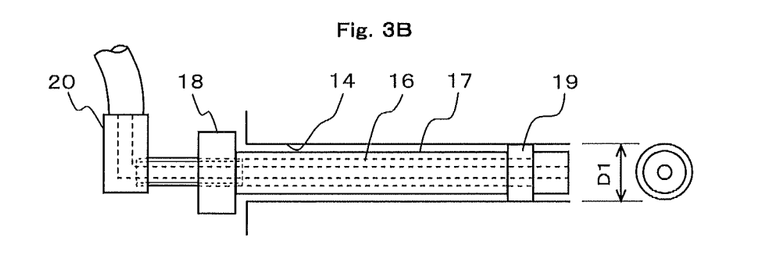
Figure 4:
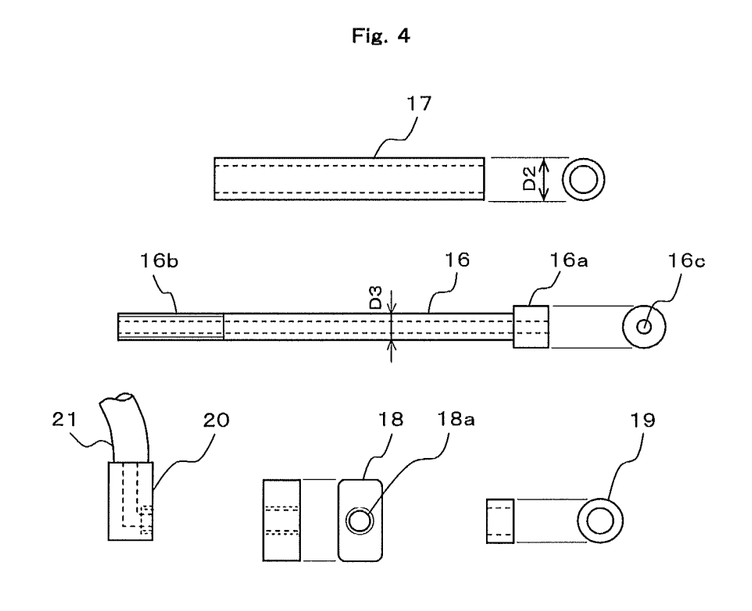
FIG. 4 are front views and side views, showing that the relevant part configuration of the resin injection apparatus into the laminated core in FIGS. 3A and 3B is disassembled.
Figure 5A:
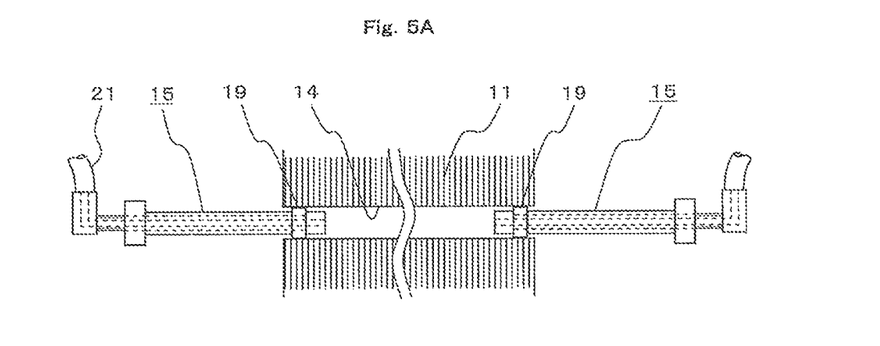
FIGS. 5A, 5B, and 5C are each a sectional view for explaining a resin injection method into the laminated core of Embodiment 1 of the present invention.
Figure 5B:
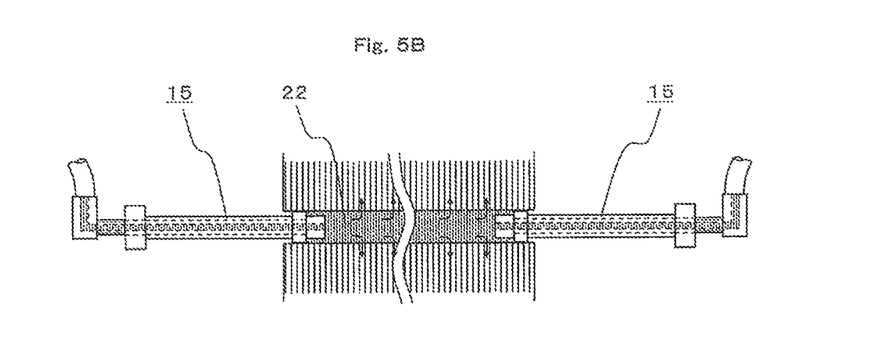
Figure 5C:
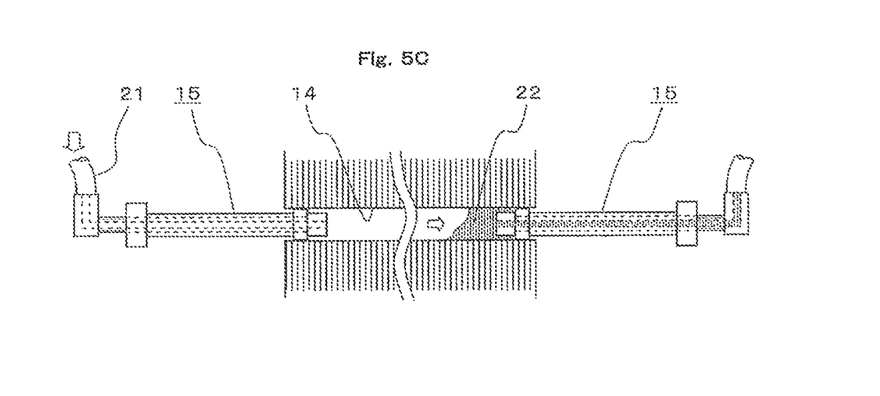

FIGS. 3A and 3B are general outline views each showing an operation process of the resin injection apparatus into the laminated core according to Embodiment 1; FIG. 3A shows a state before inserting and fixing the resin injection apparatus to the laminated core; and FIG. 3B shows a state at the time of completion of fixation. Furthermore, FIG. 4 are front views and side views, showing that the relevant part configuration of the resin injection apparatus in FIGS. 3A and 3B is disassembled; and FIGS. 5A, 5B, and 5C are sectional views each showing a resin injection process.

In the drawings, the resin injection unit 15 constituting the resin injection apparatus is composed of an inner pipe 16, an outer pipe 17, a nut 18, an elastic ring 19, and a tube joint 20.

The inner pipe 16 is configured by forming metal, synthetic resin, or the like in a straight cylindrical shape; a stepwise stopper portion 16a whose outer diameter is larger than a straight portion is provided at one end side; and a screw portion 16b of a male screw is formed at the other end side. Incidentally, a center hole 16c passing through in the length direction of the inner pipe 16 serves as a path which is for injecting resin.

The outer pipe 17 is also similarly configured by forming metal, synthetic resin, or the like in a straight cylindrical shape; the inner diameter of the outer pipe 17 is made slightly larger than the outer diameter D3 of the inner pipe 16; and thus, the inner pipe 16 can be moved in the outer pipe 17. Furthermore, the outer diameter D2 of the outer pipe 17 is made slightly smaller than the inner diameter D1 of the axial hole 14 provided in the laminated core 11 of the rotating electric machine 1 so as to be capable of being freely inserted into and removed from the axial hole 14.

The nut 18 is formed with a female screw 18a to be screwed to the screw portion 16b of the inner pipe 16. Furthermore, the outer diameter of the nut 18 is formed in a rectangular shape in FIG. 4, but is not limited to this shape and may be an ordinary hexagon nut.

The elastic ring 19 is configured by forming an elastically deformable member in a cylindrical shape, the inner diameter thereof is made to be a size through which the inner pipe 16 can pass and is made to be slightly smaller than the inner diameter D1 of the axial hole 14.

Incidentally, material of the elastic ring 19 may be one having soft elasticity; however, one having larger elasticity is easily expanded during fastening and is better in sealing property; and therefore, as a typical material, for example, urethane resin is usable. Furthermore, if the outer diameter before fastening of the elastic ring 19 is too large, workability at the time of inserting into the axial hole 14 is deteriorated; and in contrast, if the outer diameter is too small, sealing property after fastening is deteriorated.

Therefore, it is desirable to make the outer diameter of the elastic ring 19 before fastening, for example, approximately 2 to 3 mm smaller than the inner diameter of the axial hole 14 and, more specifically, to be similar degree to the outer diameter D2 of the outer pipe 17.

The tube joint 20 is screwed and connected to the screw portion 16b of the inner pipe 16 at one end side and is connected to a tube 21 at the other end side. Incidentally, connection to the inner pipe 16 may be performed by welding and/or adhesion without depending on screw-joining.

Figure 8:
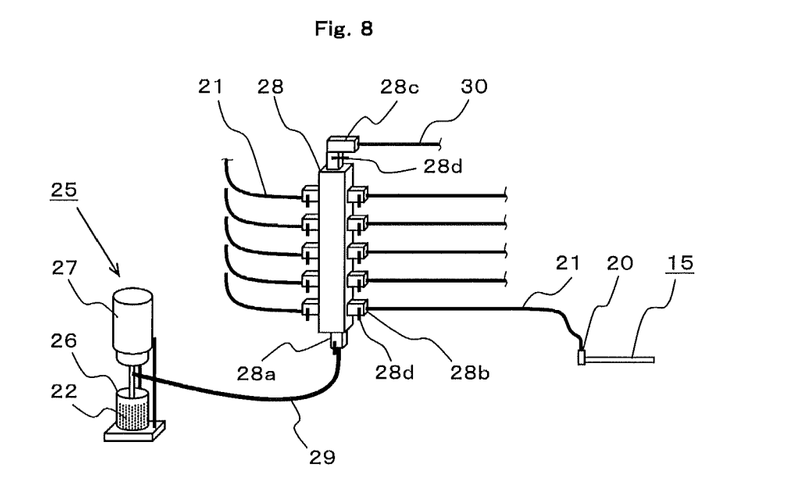
FIG. 8 is a general outline view showing the configuration of a resin injection apparatus into a laminated core of Embodiment 2 of the present invention.

The resin injection apparatus includes, for example, like a resin supplying unit to be described in FIG. 8, which is composed of a resin container which accumulates resin, a pump which is for feeding out the resin, and the like in addition to the resin injection unit 15 shown in FIGS. 3A, 3B, and 4; and the resin injection apparatus of the present invention is configured by the entirety of these components.

The resin injection unit 15 like the one shown in FIGS. 3A and 3B is configured by combining respective components shown in FIG. 4. When the resin injection unit 15 is inserted into the axial hole 14 of the laminated core 11, as shown in FIG. 3A, the outer diameter of the outer pipe 17, the outer diameter of the stopper portion 16a of the inner pipe 16, and the outer diameter of the elastic ring 19 have substantially the same dimension D2 and are set to be a dimension capable of easily inserting into and removing from the axial hole 14 by making slightly smaller than the inner diameter D1 of the axial hole 14. Furthermore, the elastic ring 19 is held in a state sandwiched by the stopper portion 16a of the inner pipe 16 and one end of the outer pipe 17.

Next, assembly to the rotating electric machine of the resin injection apparatus will be described.

As shown in FIG. 3A, the resin injection unit 15 of the resin injection apparatus is inserted into the axial hole 14 formed in the laminated core 11 of the rotating electric machine 1. Incidentally, at this time, the tip of the tube 21 connected to the tube joint 20 of the resin injection unit 15 is coupled to the resin supplying unit.

From this state, when the nut 18 is turned along the screw portion 16b of the inner pipe 16, the nut 18 moves to the right side in the drawing to move the outer pipe 17 to the right side by being pressed by the nut 18. This compresses the elastic ring 19 sandwiched by the stopper portion 16a of the inner pipe 16 and a tip end portion of the outer pipe 17 to expand the elastic ring 19 in a radial direction; and as shown in FIG. 3B, it becomes a state where the outer peripheral side of the elastic ring 19 is firmly attached to the inner periphery of the axial hole 14 and the gap between the elastic ring 19 and the axial hole 14 is filled in.

Next, resin injection operation will be described with reference to FIGS. 5A to 5C. FIG. 5A shows a removal process of resin in a state before injection; FIG. 5B, in a state during injection; and FIG. 5C, in a state after injection.

First, the resin injection units 15 are attached to both ends of the axial hole 14 of the laminated core 11; and the nuts 18 are made to move in the axial direction to move the outer pipes 17 to deform the elastic rings 19. As a result, as shown in FIG. 5A, the elastic rings 19 are press-contacted to an inner peripheral wall of the axial hole 14 to seal both ends of the axial hole 14.

Incidentally, in the drawing, the resin injection unit 15 on the right side is the discharge side of resin. Thus, although the resin injection unit 15 on the right side is a resin discharge unit as an actual function, the resin injection unit 15 on the right side is the same as the resin injection unit 15 on the left side; and therefore, description will be made with the same reference numerals assigned thereto.

Next, as shown in FIG. 5B, resin 22 is supplied from the resin supplying unit (not shown in the drawing) to the resin injection unit 15 on the left side and is injected into the axial hole 14 to be filled in a space surrounded by the elastic rings 19 of the axial hole 14. At this time, both ends of the axial hole 14 are hermetically sealed by the elastic rings 19; and therefore, the filled resin 22 does not flow out from the axial hole 14 to the outside. Then, when the resin 22 is fully filled in the space portion of the axial hole 14, the resin 22 is penetrated into a gap present between the laminated core sheets 11 of the laminated core 11 as shown by arrows.

Incidentally, from a standpoint of penetration properties to a narrow gap, a low viscosity type is desirable as the resin 22 to be used in this case, for example, epoxy resin having a viscosity of approximately 1000 mPa·S is appropriate.

Next, when injection of the resin 22 is completed by a predetermined amount of resin injection or the like, air is fed in place of the resin 22 from the tube 21 of the resin injection unit 15 on the left side as shown in FIG. 5C. This discharges the resin 22 accumulated in the inside of the axial hole 14 to the outside through the resin injection unit 15 on the right side and the tube. At this time, approximately 5 kgf/cm$^2$ is appropriate as the pressure of the air to be fed.

Incidentally, in the case where it is difficult to completely discharge the resin 22 accumulated in the inside of the axial hole 14 by only the injection of the air, the remained resin 22 may be removed by cleaning the inside of the axial hole 14 with a cleaning brush and/or a cloth piece as needed.

Next, description will be made on a usage example in the case of applying the resin injection apparatus of the present embodiment to a laminated core 11 when the configuration of the laminated core 11 is different from FIGS. 5A, 5B, and 5C.

Figure 6:
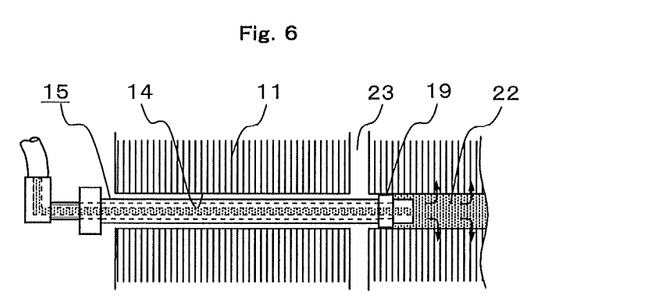
FIG. 6 is a sectional view showing an example in which the resin injection apparatus is applied to a laminated core different from FIG. 1.

As shown in FIG. 6, there is a case where a radial duct 23 is provided near an end portion of the axial direction of the laminated core 11 depending on the rotating electric machine. In this case, the length of the resin injection unit 15 is set to be longer than the length from the end of the laminated core 11 to the duct 23; and when the resin injection unit 15 is attached to the axial hole 14, the elastic ring 19 of the resin injection unit 15 is inserted so as to be located at the deeper side than the duct 23. By being configured in such a manner, the axial hole 14 is sealed by the elastic ring 19 at the deeper side of the duct 23; and thus, the resin 22 is prevented from flowing into the duct 23 during resin injection and the resin can be injected into gaps of the deeper side laminated core sheets 11a as shown by arrows.

Figure 7A:
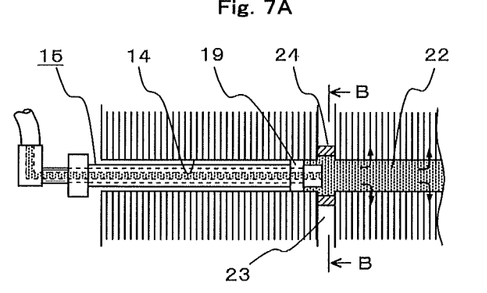
FIG. 7A is a sectional view showing an example in which the resin injection apparatus is applied to the modified example of the laminated core in FIG. 6
Figure 7B:
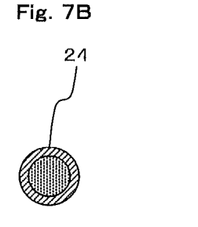
FIG. 7B is a partial sectional view taken along a B-B line.

Furthermore, even in the case where the radial duct 23 is provided near the axial end portion of the laminated core 11, there is a case where a duct piece 24 that covers the axial hole 14 is provided in the duct 23 as Shown in, for example, FIGS. 7A and 7B. FIG. 7B shows a partial section taken along a line B-B in FIG. 7A; and as shown in the drawing, the duct piece 24 is a ring shape whose inner diameter is larger than the outer diameter of the axial hole 14. If in the case of such a laminated core 11, even when the elastic ring 19 is located at the front side of the duct 23 of the axial hole 14, resin injection can be achieved without leaking the resin 22 to the duct 23.

Incidentally, the above description has been made that the laminated core 11 is the stator core 6 of the rotating electric machine 1; however, even when the laminated core 11 is the rotor core 9 of the rotor 4 of the rotating electric machine 1, manufacture can be similarly carried out and similar effects can be obtained if the rotor core 9 has the axial hole.

Furthermore, the rotating electric machine 1 is not limited to the configuration shown in FIG. 1, but can be applied if the axial hole is formed in the laminated core.

As described above, according to the resin injection apparatus into the laminated core of Embodiment 1, there is provided the resin injection apparatus into the laminated core, which uses the axial hole provided in the laminated core of the rotating electric machine and injects resin into the gap of the laminated core, the resin injection apparatus into the laminated core including: the resin supplying unit which has the resin container that accumulates the resin and the pump; and the resin injection unit which injects the resin supplied from the resin supplying unit into the axial hole of the laminated core. The resin injection unit has: the injection pipe which has the outer diameter capable of inserting into the axial hole and the center hole serving as the resin path; and the elastic ring attached to the outer periphery of the injection pipe. The resin is supplied from the resin supplying unit to the injection pipe and the resin is injected into the gap of the laminated core through the inside of the axial hole in the state where the injection pipe is inserted into the axial hole and the outer periphery of the elastic ring is firmly attached to the inner periphery of the axial hole. Therefore, even in the case of the laminated core of the large-size rotating electric machine, the resin can be easily injected into the gap of the laminated core and rigidity of the laminated core can be enhanced.

Furthermore, the injection pipe of the resin injection unit includes: the inner pipe which has the stopper portion whose outer diameter becomes larger in the stepwise manner on the outer periphery of the tip end portion and in which the center, hole serves as the resin path; and the outer pipe slidably inserted onto the outer peripheral side of the inner pipe. The elastic ring is attached between the stopper portion and the end portion of the outer pipe; and the outer pipe is pressed to expand the outer diameter of the elastic ring so as to be firmly attached to the inner periphery of the axial hole. Therefore, the gap of the axial hole can be easily blocked by the elastic ring and the above effects can be obtained.

Furthermore, according to the resin injection method into the laminated core of Embodiment 1, there is provided the resin injection method into the laminated core, which includes: the resin supplying unit which has the resin container that accumulates the resin and the pump; and the resin injection unit which injects the resin supplied from the resin supplying unit into the axial hole of the laminated core.

The resin injection method into the laminated core includes the steps of: inserting the injection pipe of the resin injection unit from one end of the axial hole; injecting the resin into the injection pipe by putting pressure from the resin supplying unit in the state where the gap between the outer peripheral side of the injection pipe and the inner peripheral side of the axial hole is blocked by the elastic ring provided on the outer periphery of the injection pipe; and discharging the resin remained in the axial hole by feeding air into the injection pipe after resin injection. Therefore, even in the case of the laminated core of the large-size rotating electric machine, the resin can be easily injected into the gap of the laminated core and thus rigidity of the laminated core can be enhanced.

Furthermore, according to the rotating electric machine of Embodiment 1, there is provided the rotating electric machine including: the stator having the stator core in which the stator winding is wound; the frame surrounding the stator core; and the rotor having the rotor core which faces the inside of the stator core via the air gap, the stator core and the rotor core being made of the laminated core laminated with thin sheets. At least one of the stator core and the rotor core is manufactured by the above-mentioned resin injection method into the laminated core. Therefore, rigidity of the laminated core can be enhanced and there can be obtained the rotating electric machine in which vibration during operation is reduced.

Embodiment 2

FIG. 8 is a general outline view showing the whole configuration of a resin injection apparatus into a laminated core of Embodiment 2 of the present invention.

In the drawing, the configuration of a resin injection unit 15 in the resin injection apparatus is the same as that of Embodiment and therefore detailed diagrammatic representation and description will be omitted.

As described above, the axial hole 14 of the laminated core 11 is formed in plural numbers and is formed in dozens of pieces in a large-size rotating electric machine in some cases. The present embodiment can easily deal with such a rotating electric machine.

In FIG. 8, a resin supplying unit 25 includes: a resin container 26 which accumulates resin 22; a pump 27 which is provided near the resin container 26 and is for feeding the resin 22; and a manifold 28 having a hose connection portion 28a connected to the pump 27 via an injection hose 29. Furthermore, the manifold 28 is provided with hose connection portions 28b to which a plurality of tubes 21 (10 tubes in the drawing) are connected; and an air hose connection portion 28c to which an air source (not shown in the drawing) is connected via an air hose 30 is provided at the other end side in the longitudinal direction of the manifold 28.

Furthermore, a valve 28d which is for controlling a flow of the resin 22 or air is attached to each of the connection portions 28a, 28b, and 28c of the manifold 28; and the resin 22 or air is flown into each connection portion when the valve 28d is opened and the flow is blocked when the valve is closed, whereby the resin or air is selectively supplied from the resin container 26 or the air source to the resin injection unit 15.

Next, resin injection operations of the present embodiment will be described by using FIG. 9.

Figure 9:
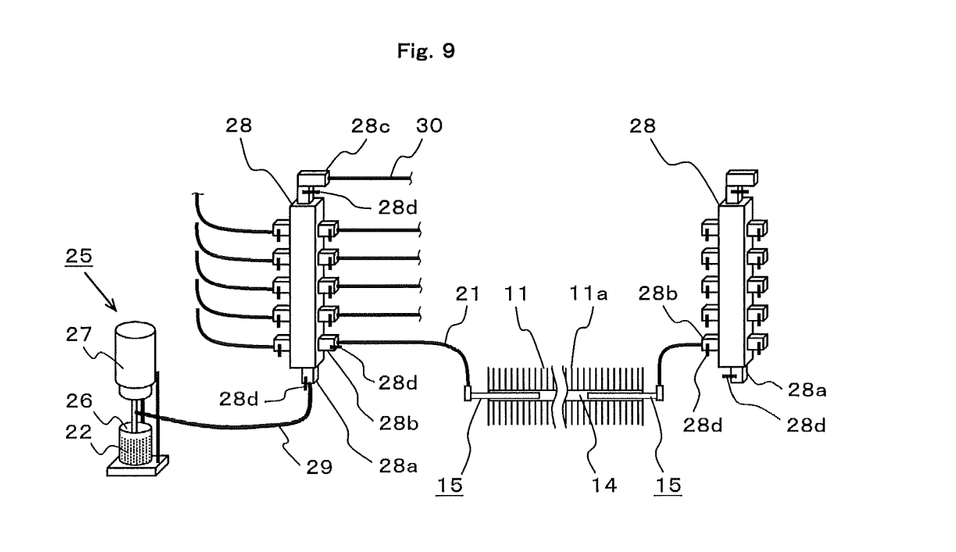
FIG. 9 is a general outline view for explaining injection operations by the resin injection apparatus of FIG. 8.

In FIG. 9, there is shown one in which the manifold 28 on the discharge side, which is the same as that on the injection side, is also provided on the opposite side of the resin injection side of the axial hole 14, that is, on the resin discharge side. In this case, the manifold 28 on the discharge side is not indispensable and the operations in the case of providing this manifold 28 on the discharge side will be described later. Furthermore, the drawing shows the case where the resin 22 is injected to one of the plurality of axial holes 14; however, the resin injection unit 15 is attached to each of the plurality of axial holes 14 provided in the laminated core 11 and the resin 22 is simultaneously injected to the plurality of the axial holes 14.

In the drawing, first, when the valve 28d of the hose connection portion 28a is opened and the pump 27 is activated, the resin 22 accumulated in the resin container 26 is fed to the injection hose 29 and is guided into the manifold 28. At this time, when the valve 28d of the air hose connection portion 28c is closed and the valve 28d of the tube a connection portion 28b is opened, the resin 22 is fed to the resin injection unit 15 and the resin 22 is injected into the gap of the laminated core sheets 11a via the axial hole 14 as described in FIGS. 5A, 5B, and 5C.

Next, when resin injection is completed by a predetermined amount of injection of resin or the like, the valve 28d of the hose connection portion 28a is closed and the valve 28d of the air hose connection portion 28c is opened to supply air into the manifold 28. As a result, the air passes through the tube 21 and flows to the resin injection unit 15; and the resin 22 remained in the axial hole 14 is ejected to the outside through the resin injection unit 15 (actually, resin discharge unit) on the discharge side.

Resin injection into the plurality of the axial holes 14 can be made at one time by the resin injection apparatus provided with such a manifold 28. Furthermore, switching work between resin injection and resin discharge by the air can be easily performed by opening and closing of the valves 28 and workability can be improved.

By the way, in the case of injecting the resin 22, the resin 22 is injected from the resin supplying unit 25 by opening the valve of the tube connection portion 28b of the injection side manifold 28. At this time, if the valve 28d of the tube connection portion 28b of the discharge side manifold 28 is closed, a pressure is applied to the resin 22 having no place to go, and this further accelerates penetration of the resin 22 into the gap of the laminated core sheets 11a. Furthermore, after injection, when the resin 22 remained in the axial hole 14 is discharged, the valve 28d of the tube connection portion 28b of the discharge side manifold 28 may be opened. At this time, a particular discharge side manifold 28 does not need to be prepared, but one which is the same as the injection side manifold 28 can be used.

As described above, according to the resin injection apparatus into the laminated core of Embodiment 2, the injection side manifold is interposed between the resin supplying unit and the resin injection unit; the injection side manifold is provided with: a plurality of connection portions connectable to the injection pipes of the resin injection unit, the air connection portions to be connected to the plurality of connection portions, and the valves which switch connection; and resin can be simultaneously injected to the plurality of axial holes and remained resin is discharged by feeding air into the axial holes by switching the valves after resin injection. Therefore, the resin can be injected into the plurality of axial holes at one time, the remained resin can be removed by air by switching the valves of the manifold after resin injection, and operations can be effectively carried out.

Furthermore, the discharge side manifold which has the discharge pipes capable of inserting into the axial holes, the plurality of connection portions connectable to the discharge pipes, and the valves that open and close the connection portions is provided on the opposite side to the resin injection side of the axial hole. Therefore, the pressure of the resin in the inside of the axial hole can be increased by closing the valve of the discharge side manifold during resin injection and penetration of the resin into the gap of the laminated core sheets can be further accelerated.

Embodiment 3

Figure 10A:
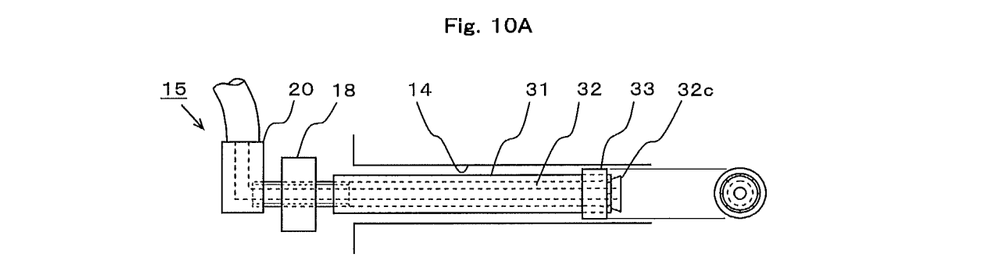
FIGS. 10A and 10B are general outline views each showing an operation process of a resin injection apparatus into a laminated core of Embodiment 3 of the present invention.
Figure 10B:
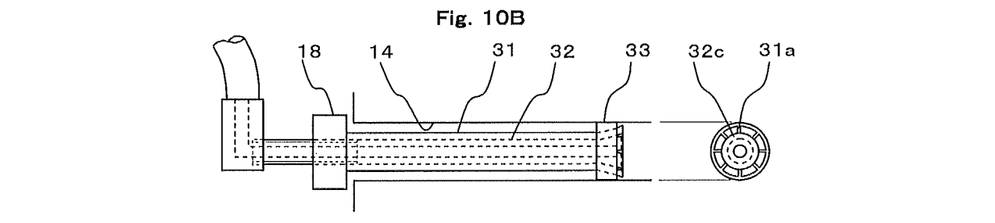
Figure 11:
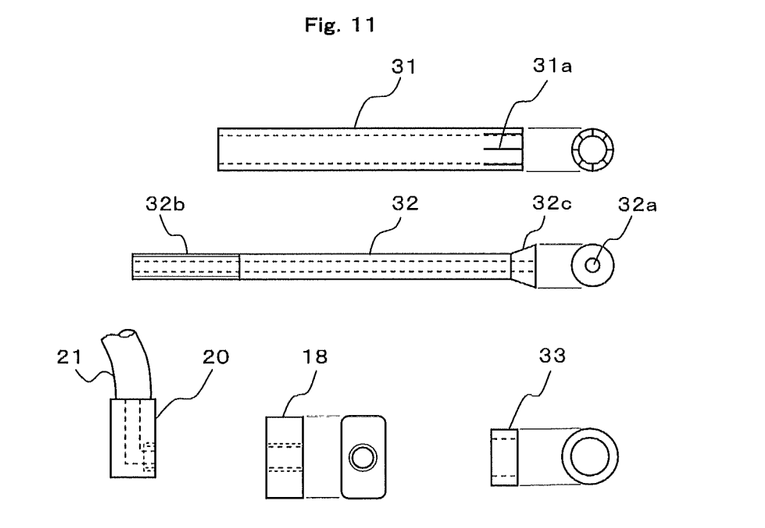
FIG. 11 are front views and side views, showing that the relevant part configuration of the resin injection apparatus into the laminated core in FIGS. 10A and 10B is disassembled.

FIGS. 10A and 10B are general outline views each showing a resin injection apparatus into a laminated core of Embodiment 3 of the present invention; FIG. 10A shows a state during attachment to the laminated core; and FIG. 10B shows a state at the time of completion of attachment. Furthermore, FIG. 11 are front views and side views, showing that the relevant part configuration of the resin injection apparatus of FIGS. 10A and 10B is disassembled. Incidentally, the same reference numerals are given to parts equivalent to those in Embodiment 1 and their description will be omitted.

First, constituent components will be described with reference to FIG. 11. A resin injection unit 15 of the resin injection apparatus is composed of an outer pipe 31, an inner pipe 32, a nut 18, an elastic ring 33, and a tube joint 20. Among these components, the nut 18 and the tube joint 20 are equivalent to those described in FIG. 4.

The outer pipe 31 is cylindrical and the inner diameter thereof is made slightly larger than the outer diameter of a straight portion of the inner pipe 32 and the straight portion of the inner pipe 32 is capable of freely inserting. Furthermore, the outer diameter of the outer pipe 31 is made smaller than the inner diameter of the axial hole 14 provided in the laminated core 11 and is made to be a dimension capable of being freely inserted into and removed from the axial hole 14 in a state where the elastic ring 33 is attached. Further, a plurality of slits are provided at a certain interval with respect to the circumferential direction of the pipe at a tip end portion serving as the side where resin is to be injected. Hereinafter, a portion provided with the slits is referred to as a slit portion 31a. Incidentally, material of the outer pipe is desirable to have slight flexibility.

The inner pipe 32 is made of metal or synthetic resin and is formed in a cylindrical shape having a center hole 32a serving as a path which is for passing resin. Furthermore, a screw portion 32b of a male screw is formed at one end side (the left side in the drawing) and a tapered portion 32c having a face expanding in a funnel shape toward a tip end is formed at the other end side. In this case, an outer face reaching from the screw portion 32b to the tapered portion 32c has the same diameter.

The elastic ring 33 is made of, for example, urethane resin; the inner diameter thereof is made to be a size capable of being fitted onto the outer pipe 31; and the outer diameter thereof is made to be a size slightly smaller than the inner diameter of the axial hole 14.

Incidentally, the inner pipe 32 is coupled to the tube joint 20 by welding and/or adhesion.

Next, operation during injection will be described with reference to FIGS. 10A and 10B.

First, as shown in FIG. 10A, a combination is made by inserting the outer pipe 31 onto the straight portion of the inner pipe 32 and by fitting the elastic ring 33 onto the slit portion 31a of the outer pipe 31; and then, this combination is inserted into the axial hole 14. After that, the nut 18 is turned along the screw portion 32b of the inner pipe 32 and the nut 18 is made to move to the right side in the drawing. The outer pipe 31 is pressed by the movement of the nut 18 to move to the right side, thereby becoming a shape in which the slit portion 31a of the outer pipe 31 runs on the tapered portion 32c of the inner pipe 32. As a result, as shown in FIG. 10B, the outer diameter of the slit portion 31a is enlarged; and thus, the diameter of the elastic ring 33 is expanded and the outer peripheral side thereof is firmly attached to the inner periphery of the axial hole 14 to seal the axial hole 14. Subsequent resin injection operation and resin discharge operation are the same as those of Embodiment 1.

As described above, according to the resin injection apparatus into the laminated core of Embodiment 3, the resin injection apparatus includes the injection pipe which includes: the cylindrical inner pipe having the tapered portion whose outer diameter is enlarged in the tapered shape on the outer periphery of the tip end portion; and the outer pipe which is slidably inserted onto the outer peripheral side of the inner pipe and has the slit portion in which the plurality of slits are formed in the peripheral direction of the end portion on the side coming in contact with the tapered portion. The outer pipe is made to slide to the tapered portion side to enlarge the tip end portion; and thus, the elastic ring attached to the slit portion of the outer pipe is made to expand and is firmly attached to the inner periphery of the axial hole. Therefore, the axial hole is sealed by the enlargement of the elastic ring, the resin can be easily injected into the gap of the laminated core, and rigidity of the laminated core can be enhanced.

Embodiment 4

Figure 12:
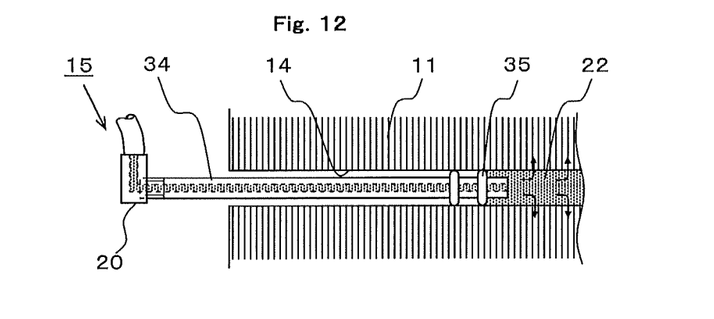
FIG. 12 is a sectional view for explaining a resin injection method into a laminated core of Embodiment 4 of the present invention.
Figure 13:
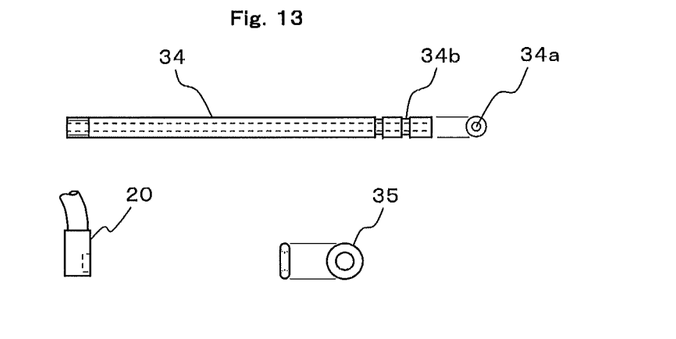
FIG. 13 are front views and side views, showing that the relevant part configuration of a resin injection apparatus into the laminated core in FIG. 12 is disassembled.

FIG. 12 is a sectional view for explaining a resin injection method of a resin injection apparatus into a laminated core of Embodiment 4 of the present invention; FIG. 13 are front views and side views, showing that the relevant part configuration of the resin injection apparatus into the laminated core in FIG. 12 is disassembled. Incidentally, the same reference numerals are given to parts equivalent to those of Embodiment 1 in the drawings and their description will be omitted.

A resin injection unit 15 of the present embodiment is composed of a cylindrical shaped injection pipe 34, an O-ring 35 serving as an elastic ring, and a tube joint 20. In this case, the tube joint 20 is equivalent to those in FIGS. 3A and 3B and FIG. 4.

In the drawings, the injection pipe 34 is made of metals, resin, or the like and is formed in a straight cylindrical shape having a center hole 34 serving as a path which is for passing resin. Furthermore, a male screw to be connected to the tube joint 20 is formed at one end side in the longitudinal direction of the injection pipe 34; and an outer peripheral groove 34b which is for fixing the O-ring 35 is formed at the other end side. The outer diameter dimension of the O-ring 35 is made slightly larger than the inner diameter of the axial hole 14.

First, the O-ring 35 is fitted onto the outer peripheral groove 34b of the injection pipe 34 to connect the tube joint 20; and if these components are inserted into the axial hole 14 of the laminated core 11, the outer diameter of the O-ring 35 is shrunken as shown in FIG. 12 and is firmly attached to the inner periphery of the axial hole 14 to seal the axial hole 14.

After that, as in Embodiment 1, resin 22 is injected into the injection pipe 34 and the resin 22 is made to penetrate into the gaps of the laminated core sheets 11a as shown by arrows in the drawing.

Incidentally, two O-rings 35 are shown in consideration of sealing property, but one O-ring may be provided. Furthermore, connection of the tube joint 20 may be performed by welding and/or adhesion.

As described above, according to the resin injection apparatus into the laminated core of Embodiment 4, the injection pipe of the resin injection unit is made of one pipe whose center hole serves as the resin path and has the outer peripheral groove near the tip end portion; and the elastic ring is made of the O-ring having the outer diameter larger than the inner diameter of the axial hole and is attached to the outer peripheral groove. Then, when the resin injection unit is inserted into the axial hole, the O-ring is firmly attached to the inner periphery of the axial hole. Therefore, constituent components can be reduced as compare with Embodiment 1 and similar effects can be obtained.

Embodiment 5

Figure 14:
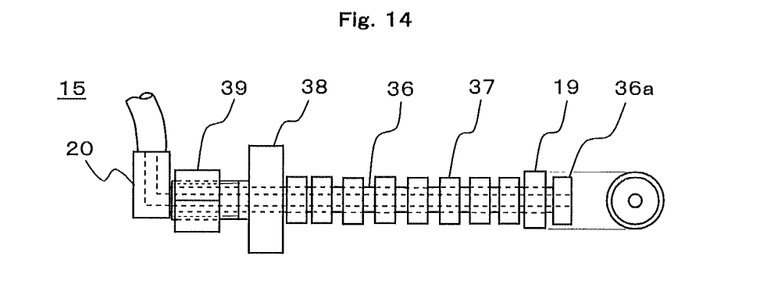
FIG. 14 are a front view and a side view, showing the relevant part configuration of a resin injection apparatus into a laminated core of Embodiment 5 of the present invention.
Figure 15:
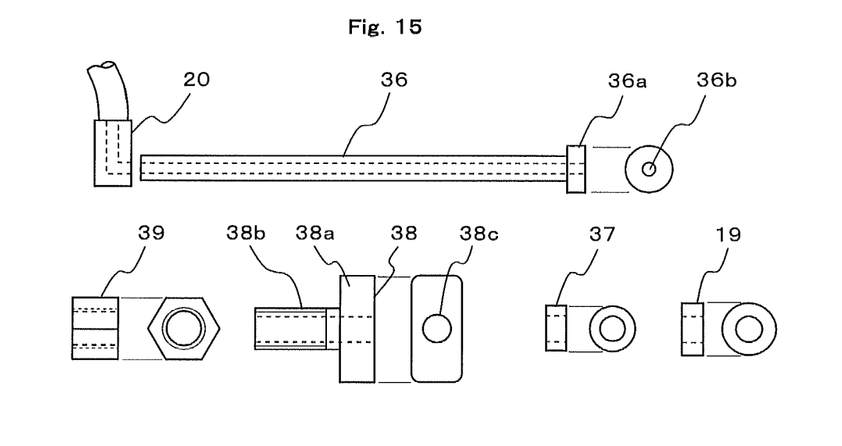
FIG. 15 are front views and side views, showing that the relevant part configuration of the resin injection apparatus into the laminated core in FIG. 14 is disassembled.

FIG. 14 are a front view and a side view, showing the relevant part configuration of a resin injection apparatus of Embodiment 5 of the present invention. FIG. 15 are front views and side views, showing that the relevant part configuration of the resin injection apparatus into a laminated core in FIG. 14 is disassembled. Incidentally, parts equivalent to those in Embodiment 1 are shown by the same reference numerals and their description will be omitted.

In the above Embodiment 1, one outer pipe 17 is used for pressing of the elastic ring 19; and accordingly, for example, when the coil end 7a (refer to FIG. 1) or the like is present near the entrance of the axial hole 14 of the laminated core 11, the coil end 7a poses an impediment and it becomes difficult to insert the resin injection unit 15 into the axial hole 14 or there also occurs a case where the insertion is impossible. The resin injection apparatus of the present embodiment is for being applied to the case where such an obstacle is present.

In FIG. 14, a resin injection unit 15 of the resin injection apparatus is composed of an inner pipe 36, outer pipes 37, an elastic ring 19, a flange 38, a nut 39, and a tube joint 20. The elastic ring 19 and the tube joint 20 are equivalent to those in Embodiment 1.

The inner pipe 36 is made of, for example, synthetic resin member having flexibility; the tube joint 20 is joined at one end side; and a stepwise stopper portion 36a having a further larger outer diameter is formed at the other end side. A center hole 36b serves as a path which is for passing resin.

The outer pipe 37 is made of a hard member and is configured by dividing into a plurality of short cylindrical shapes. Furthermore, the inner diameter of the outer pipe 37 is formed to be a size slidably fitted to the inner pipe 36 and the outer diameter thereof is formed to be smaller than the inner diameter of the axial hole 14.

The flange 38 includes a flange main body portion 38a whose outer shape is rectangular and a screw portion 38b firmly fixed to one face of the flange main body portion 38a; and a through hole 38c having an inner diameter larger than the outer diameter of the inner pipe 36 is provided in a central portion.

The nut 39 is screwed to the screw portion 38b of the flange 38.

Such respective components are combined to be integrated as a unit. More specifically, as shown in FIG. 14, the elastic ring 19, the outer pipe 37, and the flange 38 are inserted onto the inner pipe 36; and the nut 39 is screwed to join the tube joint 20 at one end side by adhesion or the like.

In this state, the plurality of outer pipes 37 are separated and therefore the inner pipe 36 having flexibility can be freely curved.

Figure 16:
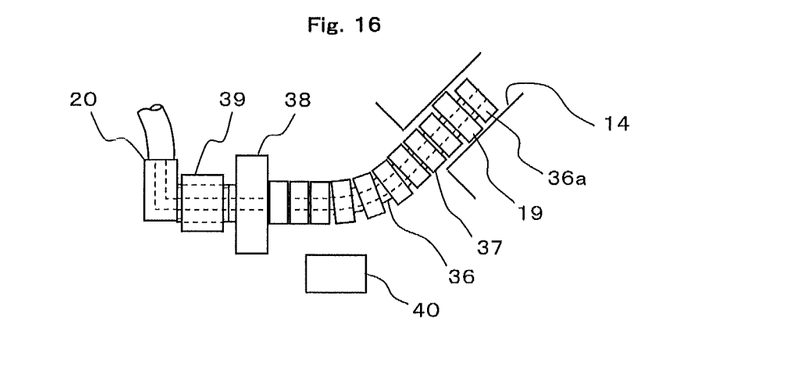
FIG. 16 is a general outline view for explaining a resin injection method in FIG. 14.

Next, as shown in FIG. 16, in the case where an obstacle 40 is present near the entrance of the axial hole 14, the inner pipe 36 of the resin injection unit 15 is bent while avoiding the obstacle 40 and is inserted into the axial hole 14.

Figure 17:
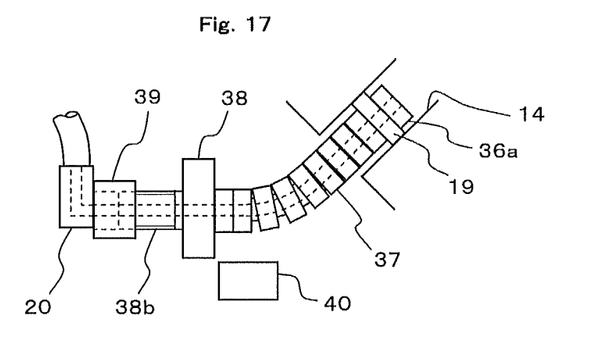
FIG. 17 is a general outline view for explaining the resin injection method in FIG. 14.

Next, the flange 38 or the nut 39 is turned to enlarge the distance between the flange 38 and the nut 39 by the screw portion 38b. This moves the flange 38 to the right side in the drawing; and the plurality of outer pipes 37 are pressed to the right side along the bent inner pipe 36. When the gap between the plurality of outer pipes 37 is eliminated, the elastic ring 19 is compressed by being sandwiched by the stopper portion 36a and the outer pipe 37 and thus the outer diameter of the elastic ring 19 is expanded to be firmly attached to the inner periphery of the axial hole 14 as shown in FIG. 17. Subsequent resin injection is carried out as in Embodiment 1 or the like.

Incidentally, the obstacle 40 is exemplarily shown in rectangle; however, actually, the obstacle 40 corresponds to, for example, the coil end portion 7a of the coil wound around the laminated core 11.

Furthermore, the method of dividing the outer pipe 37 into the plurality of short pipes in such a manner can also be applied to the resin injection unit 15 described in FIGS. 10A and 10B; and in this case, the inner pipe 32 is made of a member having flexibility and the outer pipe 31 may be divided into a plurality of short pipes and operational advantage similar to the present embodiment can be obtained.

As described above, according to the resin injection apparatus into the laminated core of Embodiment 5, the injection pipe of the resin injection unit includes: the inner pipe which is made of the flexible member, which has the stopper portion whose outer diameter becomes larger in a stepwise manner at the tip end portion and in which the center hole serves as the resin path; and the plurality of outer pipes which are slidably inserted onto the inner pipe. The elastic ring is attached between the stopper portion of the inner pipe and the tip end portion of the outer pipe; and the plurality of the outer pipes have gaps when the inner pipe is linear, and the plurality of the outer pipes are come in contact with each other and are pressed when the plurality of the outer pipes are inserted into the axial hole, whereby the outer diameter of the elastic ring is expanded to be firmly attached to the inner periphery of the axial hole. Therefore, even when the obstacle is present near the entrance of the axial hole of the laminated core, the resin can be injected into the axial hole while avoiding the obstacle and rigidity of the laminated core can be enhanced.

Embodiment 6

Figures 18A, 18B:
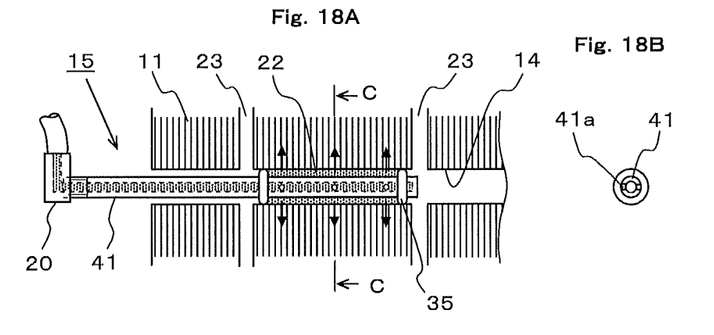
FIGS. 18A and 18B are a sectional view and a side view, for explaining a resin injection method into a laminated core of Embodiment 6 of the present invention.

FIG. 18 is a sectional view for explaining a resin injection method into a laminated core of Embodiment 6 of the present invention and shows a case where a plurality of cooling ducts 23 are provided in a laminated core 11.

In the drawing, an injection pipe 41 is configured by forming metal, synthetic resin, or the like in a straight cylindrical shape and has a structure in which a tip end portion of a center hole which is for passing resin is blocked.

Furthermore, an outer peripheral groove having a dimension slightly shorter than the thickness of the laminated core 11 sandwiched by the ducts 23 is provided at two places on the outer periphery of the injection pipe 41 and an O-ring 35 serving as an elastic ring is fitted onto each of the outer peripheral grooves.

In this case, the outer diameter of the O-ring 35 is formed slightly larger than the inner diameter of the axial hole 14 of the laminated core 11. Furthermore, a plurality of injection holes 41a passing through from the center hole in a radial direction are opened between two outer peripheral grooves of the injection pipe 41 as shown in FIG. 18B.

Such a resin injection unit 15 is inserted into the axial hole 14 of the laminated core 11 and is positioned so that two O-rings 35 are fitted onto portions sandwiched by the ducts 23. At this time, the outer diameter of the O-ring 35 is larger than the axial hole 14 of the laminated core 11; and therefore, by press-fitting the O-ring 35, the outer diameter of the O-ring 35 is shrunken and is to be firmly attached to the inner periphery of the axial hole 14 to seal the inside of the axial hole 14. After that, as in Embodiment 1, if resin 22 is injected into the injection pipe 41, the resin 22 can be made to penetrate into the gaps of the laminated core 11 sandwiched by the ducts 23 through the plurality of injection holes 41a as shown by arrows. After that, the injection pipe 41 is extracted; and thus, the resin is scraped out by the O-rings 35 and the resin is not remained in the axial hole 14. Furthermore, the remained resin 22 can be removed by cleaning the inside of the axial hole 14 with a cleaning brush and/or a cloth piece as needed.

As described above, according to the resin injection apparatus into the laminated core of Embodiment 6, the injection pipe whose tip end portion is closed is provided with the grooves at two places on the outer periphery in the length direction thereof and is formed with the injection holes that pass through in the radial direction thereof between the outer peripheral grooves; and the elastic rings each made of the O-ring having the outer diameter larger than the inner diameter of the axial hole are attached on the outer peripheral grooves. Therefore, when the injection pipe is inserted into the axial hole, the elastic rings are firmly attached to the inner periphery of the axial hole, the resin can be effectively injected into the inside of the axial hole in the portion of the laminated core sandwiched by the ducts through the injection holes, and rigidity of the laminated core in which the plurality of ducts are provided in the radial direction of the laminated core can be enhanced.

Furthermore, according to the resin injection method into the laminated core of Embodiment 6, two elastic rings to be provided on the injection pipe of the resin injection unit are arranged; the injection pipe is provided with the injection holes that pass through in the radial direction between the elastic rings; and the resin injection unit is inserted so that two elastic rings are fitted into the axial hole sandwiched between the ducts and the resin is injected. Therefore, in the case where the plurality of ducts are provided in the radial direction of the laminated core, effects similar to the above-mention can be obtained.

Furthermore, according to the rotating electric machine of Embodiment 6, even in the case of having the plurality of radial ducts in the laminated core, at least one of a stator core and a rotor core made of the laminated core is manufactured by the above-mentioned resin injection method; and therefore, rigidity of the laminated core can be enhanced and there can be obtained the rotating electric machine in which vibration during operation is reduced.

Incidentally, the resin injection apparatus into the laminated core according to this Embodiment 6 can be used even in the case of the laminated core that does not have the duct 23.

Embodiment 7

Figure 19A:
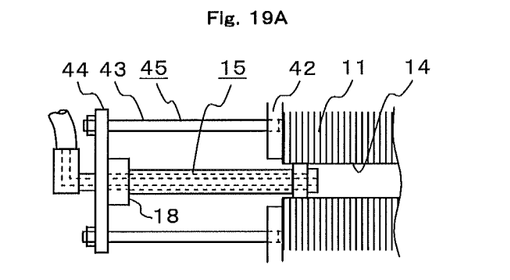
FIGS. 19A and 19B are general outline views each showing the relevant part configuration of a resin injection apparatus into a laminated core of Embodiment 7 of the present invention.
Figure 19B:
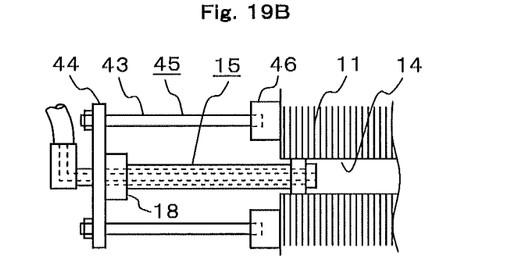

FIGS. 19A and 19B are general outline views each showing the relevant part configuration of a resin injection apparatus into a laminated core of Embodiment 7 of the present invention.

In the drawings, a resin injection unit 15 is configured as in FIGS. 3A and 3B and therefore the same reference numerals are given to equivalent parts and their description will be omitted.

In the aforementioned resin injection operations, frictional force is applied between the expanded elastic ring 19 and the axial hole 14 of the laminated core 11; however, force is applied in a direction in which the resin injection unit 15 comes off from the axial hole 14 by the reaction force of injection pressure during injection of the resin. In the present embodiment, as shown in FIGS. 19A and 19B, a support 45 which is for preventing the resin injection unit from dropping out is provided.

In the case of forming the laminated core 11, ordinarily, a fastening plate 42 is provided on both end surfaces of the laminated core 11; a bolt hole is provided in the fastening plate 42; and as shown in FIG. 19A, a supporting rod 43 is screwed into the bolt hole at one end thereof and is coupled to a supporting plate 44 that supports a nut 18 of the resin injection unit 15, thereby being fixed to the fastening plate 42. The support 45 including the supporting rod 43 and the supporting plate 44 is provided on the fastening plate 42 in such a manner; and thus, the resin injection unit 15 can be prevented from possibly dropping out by reaction force during resin injection.

Furthermore, in the case where the fastening plate 42 is not provided on the end surface of the laminated core 11 and/or in the case where the bolt hole is not provided at an appropriate position even when the fastening plate 42 is provided, as shown in FIG. 19B, it may be configured such that a magnet 46 is firmly attached to one end of the supporting rod 43 and the magnet 46 is made to stick fast to the end surface of the laminated core 11.

Incidentally, the shape of the support 45 shows an example and is not limited to the drawing.

As described above, according to the resin injection apparatus into the laminated core of Embodiment 7, the support which fixes the resin injection unit on the axial end surface of the laminated core is provided; and therefore, the resin injection unit can be prevented from possibly dropping out during resin injection.

Incidentally, the present invention can freely combine the respective embodiments and appropriately change or omit the respective embodiments, within the scope of the present invention.

DESCRIPTION OF REFERENCE NUMERALS

1: Rotating electric machine, 3: Stator, 4: Rotor,
5: Fan, 6: Stator core, 7: Stator coil,
7a: Coil end, 8: Rotating shaft, 9: Rotor core,
10: Bearing, 11: Laminated core,
11a: Laminated core sheet, 12: Through bolt,
13: Core bolt, 14: Axial hole,
15: Resin injection unit, 16: Inner pipe,
16a: Stopper portion, 16b: Screw portion,
16c: Center hole, 17: Outer pipe, 18: Nut,
18a: Female screw, 19: Elastic ring, 20: Tube joint,
21: Tube, 22: Resin, 23: Duct,
25: Resin supplying unit, 26: Resin container,
27: Pump, 28: Manifold, 28d: Valve, 29: Injection hose, 30: Air hose, 31: Outer pipe,
31a: Slit portion, 32: Inner pipe, 32a: Center hole,
32b: Screw portion, 32c: Tapered portion,
33: Elastic ring, 34: Injection pipe, 34a: Center hole,
34b: Outer peripheral groove, 35: O-ring, 36: Inner pipe,
36a: Stopper portion, 36b: Center hole, 37: Outer pipe,
38: Flange, 38b: Screw portion, 38c: Through hole,
41: Injection pipe, 41a: Injection hole,
42: Fastening plate, 43: Supporting rod,
44: Supporting plate, 45: Support, 46: Magnet

The invention claimed is:

1. A resin injection method into a laminated core, which uses an axial hole provided in a laminated core of a rotating electric machine and injects resin into a gap of said laminated core using a resin supplying unit which has a resin container that accumulates the resin and a pump, and a resin injection unit which injects the resin supplied from said resin supplying unit into the axial hole of said laminated core, the resin injection method into the laminated core comprising:
　　inserting an injection pipe of said resin injection unit from one end of the axial hole;
　　supplying the resin into said injection pipe by putting pressure from said resin supplying unit in a state where a gap between the outer peripheral side of said injection pipe and the inner peripheral side of the axial hole is blocked by a first elastic ring provided on the outer periphery of said injection pipe;
　　injecting the resin from the injection pipe into the gap of the laminated core; and
　　discharging resin remaining in the axial hole by supplying air into said injection pipe after resin injection.

2. The resin injection method into the laminated core according to claim 1, comprising:
　　providing a second elastic ring arranged at an interval with the first elastic ring on said injection pipe of said resin injection unit;
　　said injection pipe is provided with an injection hole that passes through in a radial direction between said first and second elastic rings; and
　　the resin is injected into the axial hole through the injection hole.

3. A rotating electric machine comprising:
　　a stator having a stator core in which a stator winding is wound;
　　a frame surrounding said stator core; and
　　a rotor having a rotor core which faces the inside of said stator core via an air gap,
　　said stator core and said rotor core being made of a laminated core laminated with thin sheets and gaps between the thin sheets, wherein
　　at least one of said stator core and said rotor core is manufactured by the resin injection method into the laminated core as set forth in claim 1 so that resin fills the gaps.

* * * * *